Oct. 12, 1937.　　　　　G. B. GRONVOLD　　　　2,095,521
GYNECOLOGICAL CALCULATING DEVICE
Original Filed Dec. 18, 1934　　　3 Sheets-Sheet 1

Inventor
George B. Gronvold
By Albert E. Dieterich
Attorney

Oct. 12, 1937.  G. B. GRONVOLD  2,095,521
GYNECOLOGICAL CALCULATING DEVICE
Original Filed Dec. 18, 1934  3 Sheets-Sheet 2
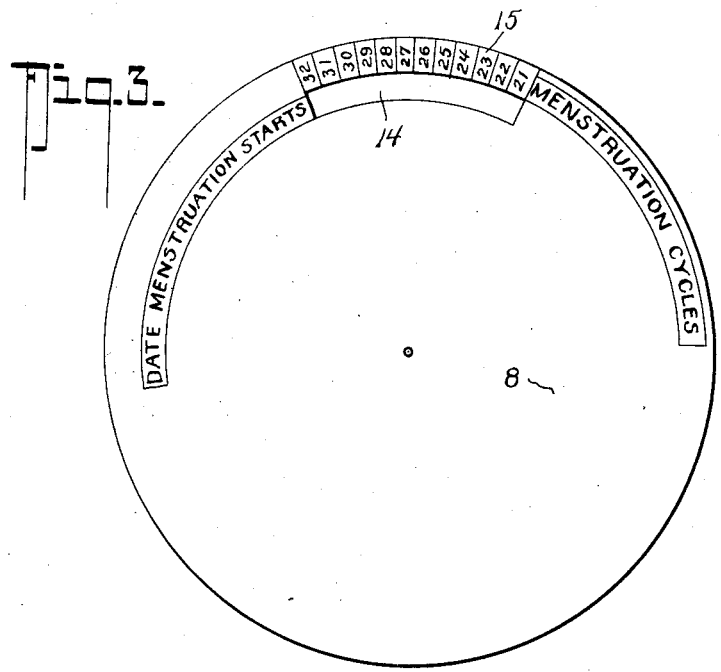
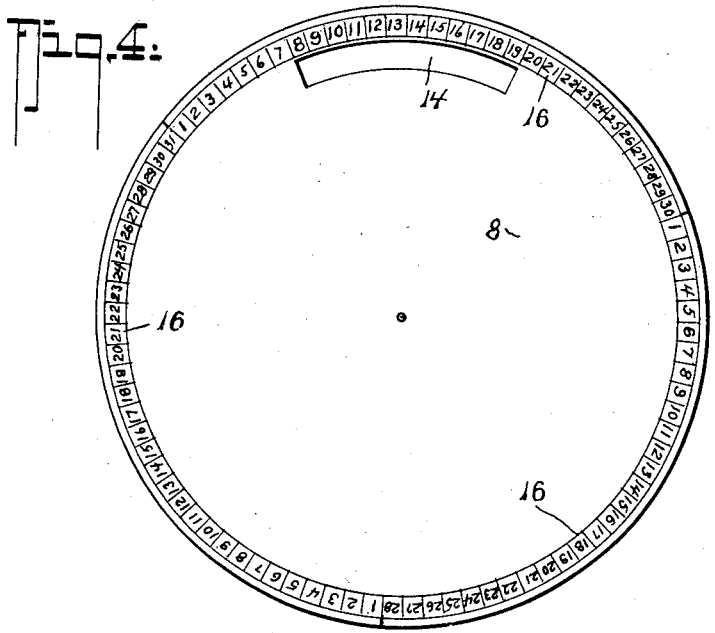
Inventor
George B. Gronvold
By Albert E. Dieterich
Attorney Oct. 12, 1937.  G. B. GRONVOLD  2,095,521
GYNECOLOGICAL CALCULATING DEVICE
Original Filed Dec. 18, 1934  3 Sheets-Sheet 3
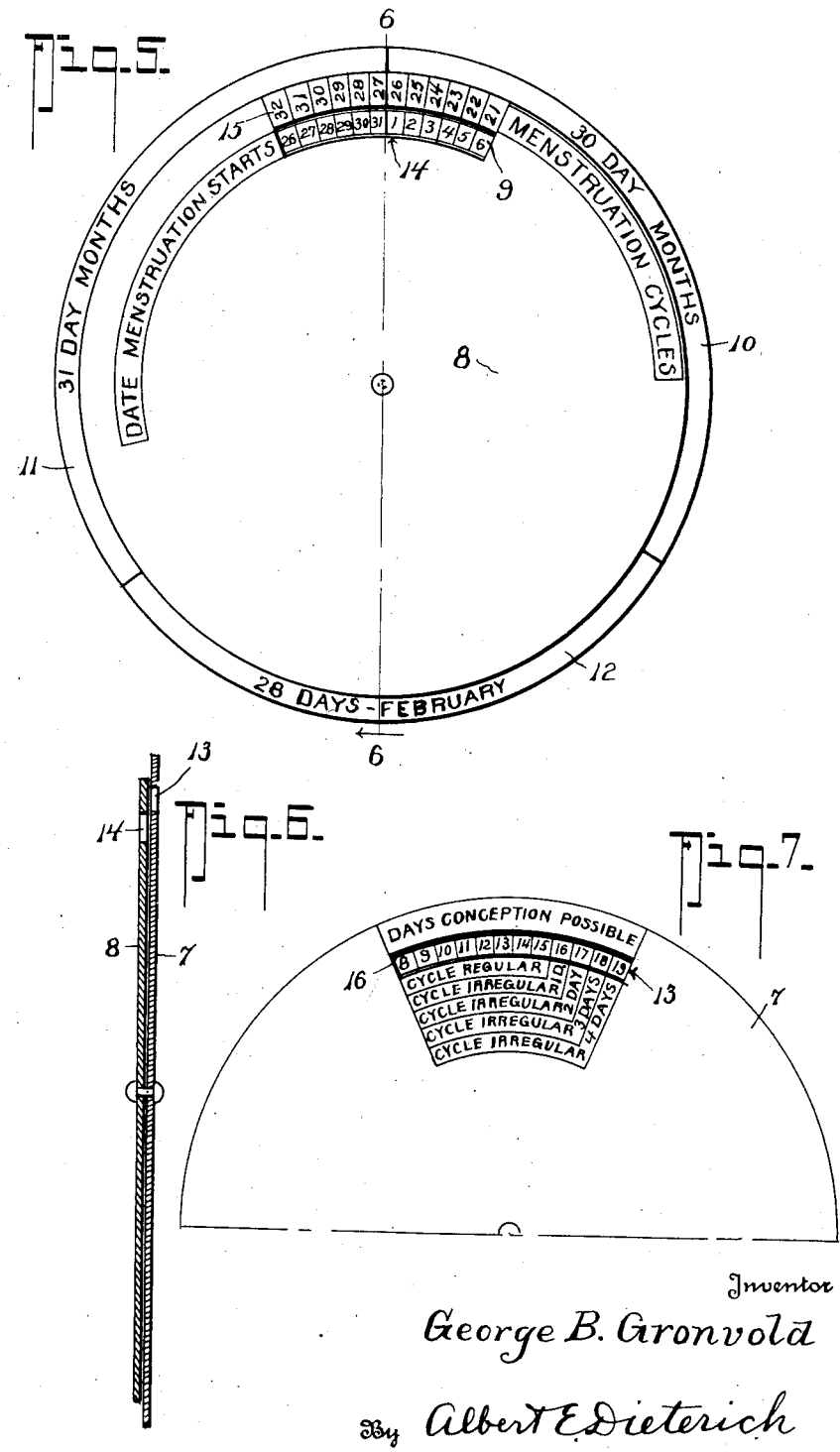
Inventor
George B. Gronvold
By Albert E. Dieterich
Attorney Patented Oct. 12, 1937

2,095,521

UNITED STATES PATENT OFFICE 2,095,521

GYNECOLOGICAL CALCULATING DEVICE

George Bott Gronvold, Seattle, Wash.

Original application December 18, 1934, Serial No. 758,047. Divided and this application August 17, 1936, Serial No. 96,488. In Canada December 18, 1934

11 Claims. (Cl. 40—115)

This invention relates to a gynecological calculating device for women; its object is to provide a simple méchanical device whereby a woman may obtain instantly and by a mere inspection vital physiological data regarding her monthly periods of fertility, and thus entirely avoid the necessity for confusing and troublesome calculations.

It may be definitely stated that recent conclusions reached by the co-ordinated findings of medical science have clearly established the fact that there is a well defined period of fertility in the monthly physiological cycle of every normal woman, and my invention is based upon this generally accepted knowledge. These periods are naturally based upon the date of the commencement of menstruation and the date of its probable recurrence. In the findings above referred to, it appears that ovulation almost invariably occurs within a period which is twelve to sixteen days before the commencement of the next menstrual cycle, and that the period for conception is almost invariably limited to the eight days between the twelfth and the nineteenth days (inclusive) before the commencement of the next cycle of menstruation. These are the essential facts upon which my invention has been developed, and they mark an important deviation from the previously accepted dicta on the subject, inasmuch as when the commencement of the next menstrual cycle is taken as the datum point of the deductions, the variable period due to differing lengths of the menstrual cycle occasionally met with and amounting to a variation of the order of say four days in either direction from the normal of twenty-eight days, the said deductions are of necessity positioned at the other end or the commencement of the current cycle. Thus the method in question which makes its deductions from the commencement of the current cycle obviously introduces an element of serious error in every case where the menstrual cycle is non-normal in length. This error is entirely eliminated by my device which completely covers all the usual variations of length in the menstrual cycle. There are, however, well known deviations from normalcy in the periodicity of these physiological occurrences which present difficulties, but these are also taken into view in my device so that any confusion on such account is avoided.

In carrying my invention into effect I preferably make use of flat members as being the simplest both to construct, to handle and to read. This flat form is not, however, to be taken as limitative, as obviously any regular geometrical surface may be employed to afford identical functions. The simplest form of my device consists of two scales, preferably (although not necessarily) arcuate and concentric, the one fixed, the other movable thereon, each with a scale divided off to indicate days of the month, and each with slots placed therethrough which indicate various physiological data, including particularly the fertile period above named, the mechanical position of these slots being definitely related to the commencement and recurrence of the menstrual cycle. To operate, the movable scale is shifted until the indicia thereon marking the length of the known menstrual cycle is brought opposite the day of the month, on the scale of the fixed member, upon which menstruation first commenced, when the days included within the period of fertility are at once seen by inspection and read through a slot for that purpose. From this simple description of the merest elements of the invention the fuller development of my completed device will be readily apparent.

To the attainment of the aforesaid objects and ends the invention still further resides in the novel details of construction, combination and arrangement of parts, all of which will be first fully described in the following detailed description, and then be particularly pointed out in the appended claims, reference being had to the accompanying drawings, in which:—

Figure 3 is a front view of the movable member.

Figure 4 is a rear view of the movable member.

Figure 5 is a front view of the movable member in place upon the stationary member.

Figure 6 is a section on line 6—6 of Figure 5.

Figure 7 is a detail rear elevation of the device.

Figure 1:
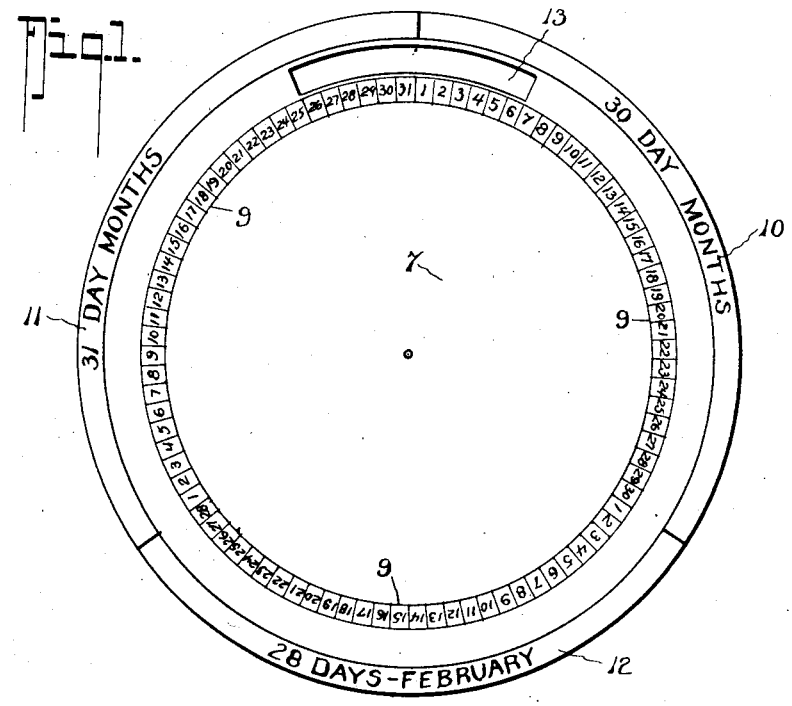
Figure 1 is a front view of the stationary member.
Figure 2:
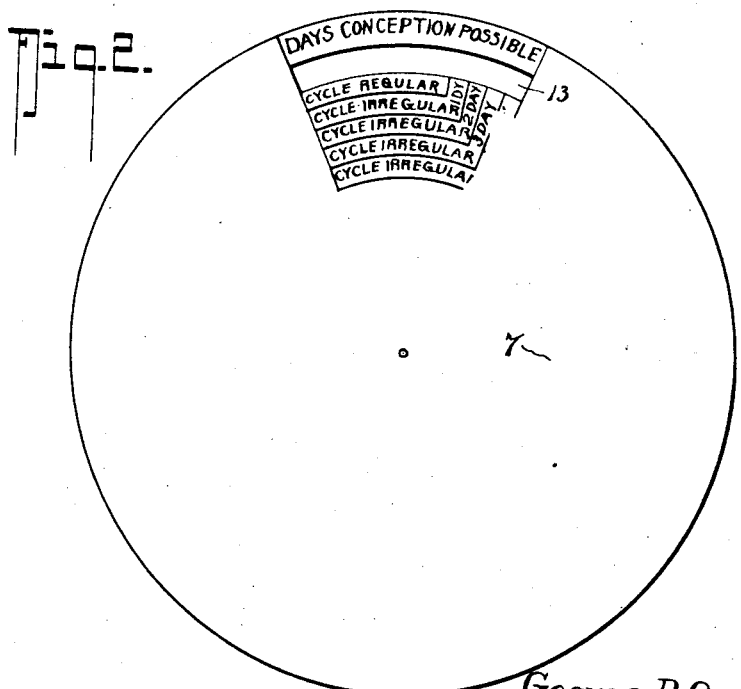
Figure 2 is a rear view of the stationary member.

These drawings show preferred and convenient embodiments of the device. They are not intended to be limitative as to details except in so far as such may be included within the scope and language of the claims. My device can be produced in an endless variety of forms and materials, such as Celluloid, stiff paper, artificial ivory, aluminum, pyralin, and the like. The first mentioned is the type illustrated, in which the numeral 7 indicates the base or stationary member and 8 the movable member. The member 7 is in this case of dial form, having an annular peripheral equi-angular scale 9. The scale is divided into eighty-nine parts so that monthly periods of thirty, twenty-eight and thirty-one, respectively, are available without correction for varying calendar periods. The corresponding months to which these respective periods belong may be labeled outside the scale 9. Thus the months of April, June, September and November are comprised within the thirty divisions of the scale 10. The months of January, March, May, July, August, October and December are similarly dealt with within the thirty-one divisions of the scale at 11, and the month of February between the twenty-eight divisions of the scale as at 12. This eliminates trouble from the vagaries of the calendar. An inspection slot 13 in the stationary dial member 7 and immediately beyond the scale 9 is cut, wherethrough from the back of the dial member 7 the required data showing the fertile periods in the monthly physiological cycles of a woman can be read from off the rear side of the movable disc member 8. A slot, in the present instance, an arcuate and concentric slot 14, is cut in the movable member 8 so as to expose days of the year 9 on the stationary member 7, and is of sufficient length to correspond to the usual normal varying menstrual cycles of a woman 15 marked on the face of the movable member 8 and shown in the present case as varying from 21 to 32 days. These cycle lengths are not limited to 21 to 32 days, but are preferable as covering the usual normal menstrual cycles of most women. On the reverse side of the movable member 8 is an annular peripheral equi-angular scale 16 similar to 9 on the face of the stationary member 7, composed of eighty-nine parts divided into similar groups of thirty, twenty-eight and thirty-one, respectively, reading in the same direction but in opposite directions when placed together. The scale 16 is so arranged that it may be read through slot 13 from the reverse side of the stationary member 7.

Figure 5 shows the movable member 8 placed upon the stationary member 7 and revolvably secured at a common center.

It is advisable to make the length of slot 13 on the stationary member equal at least to 12 parts to allow for at least 4 days irregularities in the menstrual cycle, so that when the cycle is irregular one day can be added for every day of irregularity.

In the present drawings, the slot 14 is placed opposite the days 8 to 19 as shown in Figure 4. When this is done the slot 13 should be placed opposite the days 26, 27, 28, 29, 30, 31, 1, 2, 3, 4, 5, 6, as shown in Figure 1. If either slot is varied in length or position, the other slot should also be varied in position, so that when the menstrual cycle length is brought opposite the day upon which menstruation commences the fertile days may be read from the slot on the back of the stationary member. The length of the menstrual cycle is not restricted to 21 to 32, but these figures are used in the drawings and these figures are placed in the opposite direction to the date numbers as at 15.

In operation the device functions as follows:—
The number of days in the menstrual cycle being known, this number on that portion of the scale 15 is placed opposite the (date) number on scale 9 (using the month group 10, 11 or 12, as the case may be) which corresponds to the date of commencement of the current menstrual cycle, and the days when conception is possible may be read (by turning over the device) on the peripheral scale 16 on the back of the movable member 8 through the slot 13 on the stationary member.

This application is a division of my application filed December 18, 1934, Serial No. 758,047.

From the foregoing description, taken in connection with the accompanying drawings, it is thought that the complete construction, operation and advantages of the invention will be clear to those skilled in the art.

What I claim is:

1. A calculating device of the type herein described and comprising a stationary member and a member movable thereon, corresponding scales on each of said members, said scales consisting of equi-spaced apart divisions representing days of a month in sequential order, said divisions on said movable member being grouped to embrace the required physiological data concerning a menstrual cycle, said stationary and movable members each having a cut away portion located at different distances from the edge of the members so as to be out of register with one another exposing part of a scale on the other member where-through the required data may be read free from the confusing contiguity of other indicia.

2. In a gynecological calculating device a dial member, a disc member pivotally secured to said dial member, said members each having one set only of annularly arranged scales arranged in sequence, one of thirty-one divisions, one of thirty divisions, and one of twenty-eight divisions, representing months of varying lengths, and means co-operative with said scales for indicating the days when conception is possible, and the sterile days according to the particular menstrual cycle of the user.

3. A gynecological calculating device comprising two flat members pivotally secured together, one of said members having a scale of equally spaced apart divisions representing groups of days in sequence of the different calendar lengths and having an arcuate slot aperture adjacent said scale of a length measured by the number of said divisions which are equivalent in days to the maximum length of the period of possible conception, said second member having an arcuate slot aperture adapted to uncover and disclose a corresponding arcuate portion of the said scale, the second said slot being of a length measured as aforesaid equivalent to the maximum number of different lengths in days of the menstrual cycle and labeled accordingly on the front surface of last said member, the rear surface of the last said member having an annular scale with divisions angularly similar to those of first said scale and adapted to be observed through the aperture in the first said member whereby upon adjusting the position of the second said member so that any one of the said different lengths of a menstrual cycle is opposite the day on first said scale corresponding with that on which the current menstrual cycle commenced, and then reversing the entire device the number of days indicated on the rear surface of the said second member and readable through the slot aperture of the first said member comprise the said maximum period of possible conception.

4. A gynecological calculating device comprising two flat members pivotally secured together, one of the said members having a scale of equally spaced apart divisions representing groups of days in sequence of the different calendar lengths and having a slot aperture adjacent said scale of a length measured by the number of said divisions which are equivalent in days to the maximum length of the period of possible conception, said second member having a slot aperture adapted to uncover and disclose a corresponding portion of the said scale, the second said slot being of a length measured as aforesaid and equivalent to the maximum number of different lengths in days of the menstrual cycle and labeled accordingly on the front surface of last said member, the rear surface of the last said member having an annular scale with divisions corresponding to those of first said scale and adapted to be observed through the aperture in the first said member whereby upon adjusting the position of the second said member so that any one of the said different lengths of a menstrual cycle is opposite the day on first said scale corresponding with that on which the current menstrual cycle commenced and then reversing the entire device the number of days indicated on the rear surface of the second member and readable through the slot aperture of the first said member comprise the said maximum period of possible conception.

5. A gynecological calculating device comprising two flat members pivotally secured together, one of said members having a scale of equally spaced apart divisions indicating a sequence of days in groups of thirty-one, thirty and twenty-eight respectively and having an arcuate slot aperture adjacent said scale of a length measured by the number of said divisions which are equivalent in days to the maximum length of the period of possible conception, said second member having an arcuate slot aperture adapted to uncover and disclose a corresponding arcuate portion of the said scale, the second said slot being of a length measured as aforesaid equivalent to the maximum number of different lengths in days of the menstrual cycle and labeled accordingly on the front surface of last said member, the rear surface of the last said member having an annular scale with divisions angularly similar to those of first said scale and adapted to be observed through the aperture in the first said member whereby upon adjusting the position of the second said member so that any one of the said different lengths of a menstrual cycle is opposite the day on first said scale corresponding with that on which the current menstrual cycle commenced and then reversing the entire device the number of days indicated on the rear surface of the said second member and readable through the slot aperture of the first said member comprise the said maximum period of possible conception.

6. A gynecological calculating device comprising two flat members pivotally secured together, one of the said members having a scale of equally spaced apart divisions indicating a sequence of days in groups of thirty-one, thirty and twenty-eight respectively and having a slot aperture adjacent said scale of a length measured by the number of said divisions which are equivalent in days to the maximum length of the period of possible conception, said second member having a slot aperture adapted to uncover and disclose a corresponding portion of the said scale, the second said slot being of a length measured as aforesaid and equivalent to the maximum number of different lengths in days of the menstrual cycle and labeled accordingly on the front surface of last said member, the rear surface of the last said member having an annular scale with divisions corresponding to those of first said scale and adapted to be observed through the aperture in the first said member whereby upon adjusting the position of the second said member so that any one of the said different lengths of a menstrual cycle is opposite the day on first said scale corresponding with that on which the current menstrual cycle commenced and then reversing the entire device the number of days indicated on the rear surface of the second member and readable through the slot aperture of the first said member comprise the said maximum period of possible conception.

7. A gynecological calculating device comprising two flat surfaced members pivotally secured together and comprising a dial member and an index member, said dial member having an annular scale of equi-angular divisions indicating a sequence of days in groups of thirty-one, thirty and twenty-eight respectively, and having a slot aperture adjacent said scale corresponding in length to any desired number of different lengths in days of usual and unusual menstrual cycles, the said index member having a slot aperture therethrough adapted to expose a consecutive number of divisions on said annular scale corresponding in days to the maximum period during which conception is deemed possible in any desired length of menstrual cycle, said index member having on its rear surface an annular scale similar in type and angularity to the first said scale and so positioned that its indications may be read through the first said aperture and from the rear of the device.

8. A gynecological calculating device comprising two flat surfaced members pivotally secured together and comprising a dial member and an index member, said dial member having an annular scale of equi-angular divisions indicating a sequence of days in groups of thirty-one, thirty and twenty-eight respectively, indicating means adjacent said scale and corresponding in length to any desired number of different lengths in days of usual and unusual menstrual cycles, the said index member having indicating means adapted to indicate a consecutive number of divisions on said annular scale corresponding in days to the maximum period during which conception is deemed possible in any desired length of menstrual cycle, said index member having on its rear surface an annular scale of the same kind as the first said scale and said dial member having an opening so positioned that the scale indications on the rear surface of said index member may be read from the rear of the device.

9. In a gynecological calculating device comprising in combination a base member having thereon an equally divided scale composed of three sections in sequence, one of twenty-eight divisions representing the days in the month of February, another of thirty divisions representing the days respectively in the months of April, June, September and November, and a third of thirty-one divisions representing respectively the days in the months of January, March, May, July, August, October and December; a movable member secured to said base member, said movable member having a portion removed to expose a number of said scale divisions of the base member and itself having adjacent said removed portion a scale to register with the exposed divisions of said base member, said scale on said movable member being numbered consecutively to represent menstrual cycles; and means co-operative with said base member and said movable member for indicating the days when conception is possible, said means being governed by the setting of the menstrual cycle number on the movable member into position to register with the exposed date on said base member scale for the month and day the present menstrual period started.

10. In a gynecological calculating device, a base member having thereon an equally divided scale composed of three sections, one of twenty-eight divisions representing the days in the month of February, another of thirty divisions representing the days respectively in the months of April, June, September, and November, and a third of thirty-one divisions representing respectively the days in the months of January, March, May, July, August, October and December; a movable member located on said base member, said movable member having a portion removed to expose a number of scale divisions of the base member and itself having on its exposed face and adjacent said removed portion a scale to register with the exposed divisions of said base member, said scale on said movable member being numbered consecutively to represent menstrual cycles, said movable member on that face which is adjacent the base member having a scale equally divided into three sections like the scale on said base member, said base member having a portion removed to expose a number of scale divisions on said movable member to provide means for indicating the days when conception is possible, said means being governed by the setting of the menstrual cycle number on the movable member into position to register with the exposed date on said base member scale for the month and day the present menstrual period started.

11. In a gynecological calculating device, a base member having an equally divided scale composed of three sections, one of twenty-eight divisions representing the days in the month of February, another of thirty divisions representing the days respectively in the months of April, June, September and November, and a third of thirty-one divisions representing respectively the days in the months of January, March, May, July, August, October and December, said base member having an indicating band on its face divided into three sections corresponding to the three sections of the scale aforesaid, said band being spaced from the three-sectioned scale, a movable member secured over the front face of said base member, said movable member covering the base member's scale but exposing the indicating band of said base member, said movable member on its back face having an equally divided scale composed of three sections corresponding to those on the scale of said base member, said base member and said movable member having portions removed to expose a number of scale divisions of the base member through the movable member and a number of divisions of the scale of the movable member through the base member, said movable member having adjacent its removed portion a scale to register with the exposed divisions of the scale of the base member, said scale on said movable member being numbered consecutively to represent the menstrual cycles; said base member having on its back division indications cooperating with the removed portion of said base member to indicate regular and irregular cycles of menstruation in cooperation with the exposed portion of the scale of said movable member, all being arranged whereby the number of days when conception is possible is indicated by the setting of the menstrual cycle number on the movable member into position to register with the exposed date on said base member scale for the month and day the present menstrual period started.

GEORGE BOTT GRONVOLD.